United States Patent [19]

Lighty et al.

[11] 4,341,441
[45] Jul. 27, 1982

[54] METHOD OF MAKING SOLID PREFORMS AND OPTICAL FIBERS DRAWN THEREFROM

[75] Inventors: Paul E. Lighty, Lafayette, N.J.; Philip W. Black, Mountfitchet; John Irven, Bishop Stortford, both of England

[73] Assignee: International Standard Electric Corp., New York, N.Y.

[21] Appl. No.: 761,746

[22] Filed: Jan. 24, 1977

Related U.S. Application Data

[63] Continuation of Ser. No. 497,990, Aug. 16, 1974, abandoned.

[30] Foreign Application Priority Data

Aug. 21, 1973 [GB] United Kingdom ............... 39444/73

[51] Int. Cl.³ .................... C03B 37/025; C03B 37/075
[52] U.S. Cl. .................................. 350/96.30; 65/3.12; 65/3.2; 427/163; 427/231; 427/237
[58] Field of Search ................ 65/3 A, DIG. 7, 2, 18, 65/3.12, 18.2, 3.2; 427/163, 167, 231, 237; 350/96.30, 96.31

[56] References Cited

U.S. PATENT DOCUMENTS

| | | | |
|---|---|---|---|
| 3,711,262 | 1/1973 | Keck et al. | 65/3.12 |
| 3,737,292 | 6/1973 | Keck et al. | 65/3.12 |
| 3,823,995 | 7/1974 | Carpenter | 65/3.12 |
| 3,884,550 | 5/1975 | Maurer et al. | 65/3.11 X |
| 3,961,926 | 6/1976 | Asam | 65/3.12 |

OTHER PUBLICATIONS

Stecher, Editor, *The Merck Index of Chemicals and Drugs*, published by Merck and Co. Inc., Rahway, N.J., 1960, p. 934.

*Primary Examiner*—Richard V. Fisher
*Attorney, Agent, or Firm*—John T. O'Halloran

[57] ABSTRACT

An optical glass fiber is formed of an inner layer of germania doped glass within the bore of the outer cladding tube of silica. The tube with the higher index of refraction inner layer is rotated while being heated to collapse the bore to form an optical fiber preform. The preform is then drawn into fiber in a separate operation. A first silica layer can be deposited within the tube bore before the germania doped layer. The deposition of germania takes place under hydrogen free conditions. Appropriate heat treatment of the tube avoids excessive evaporation of germania and provides a graded transition of the refractive index in the boundary between core and cladding.

11 Claims, 4 Drawing Figures

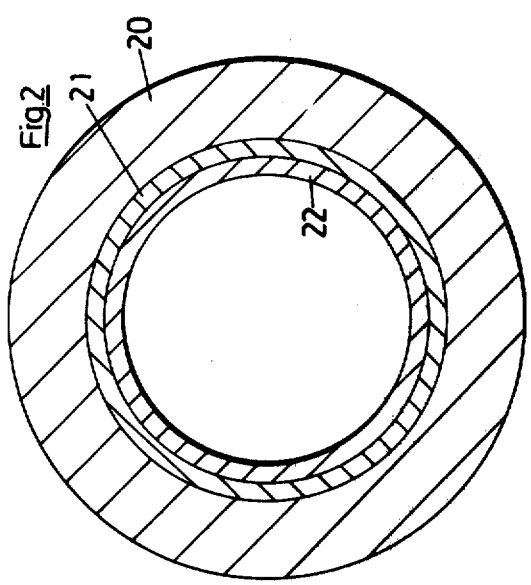
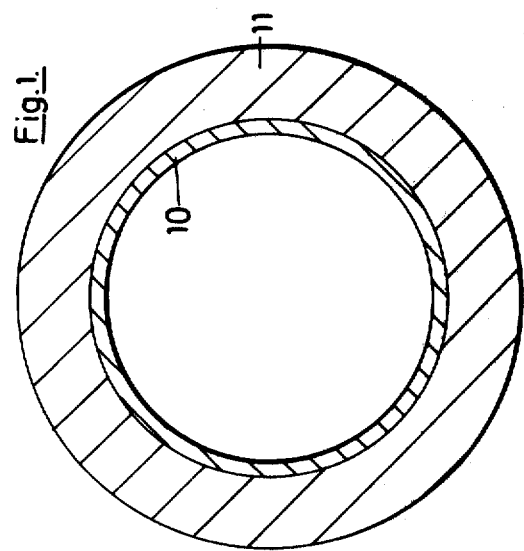
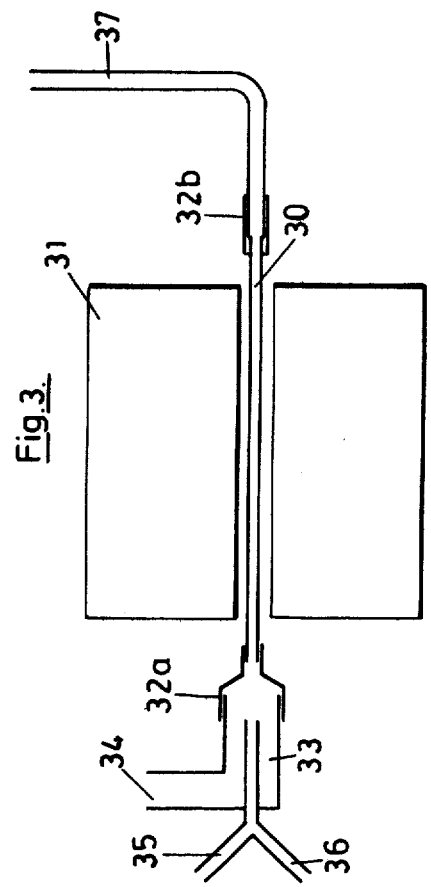

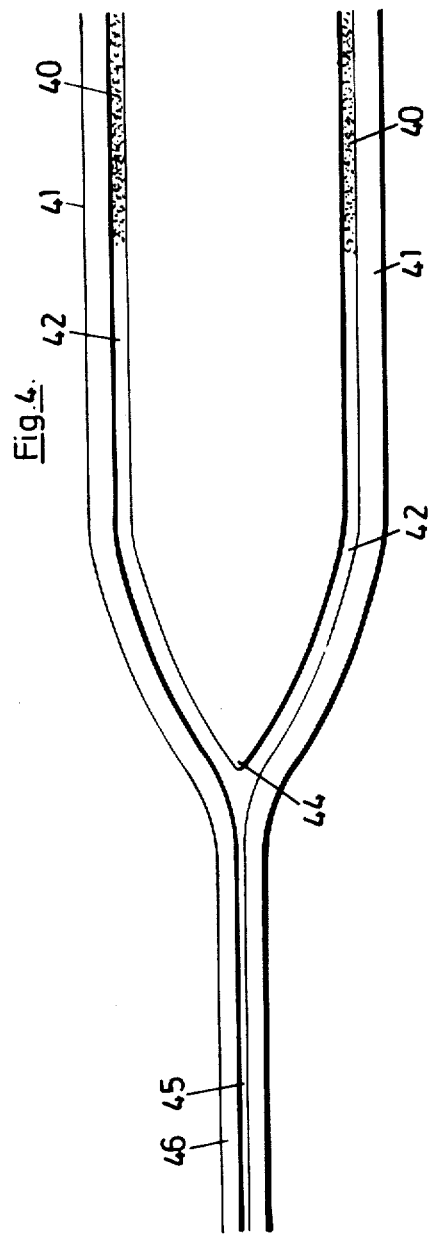

METHOD OF MAKING SOLID PREFORMS AND OPTICAL FIBERS DRAWN THEREFROM

This is a continuation of application Ser. No. 497,990, filed Aug. 16, 1974, now abandoned.

BACKGROUND OF THE INVENTION

1. Field of the Invention

This invention relates to the manufacture of optical fibres and optical fibre preforms.

2. Description of the Prior Art

The previously known method for producing such optical fibres is described in U.S. Pat. No. 3,737,293, issued June 5, 1973 and U.S. Pat. No. 28,028, issued June 4, 1974. In this method the coated bore is collapsed as the tube is drawn during the same operation, which is difficult to control.

SUMMARY OF THE INVENTION

It is therefore the object of the present invention to provide an improved method for producing optical fibres.

According to the present invention there is provided a method of making an optical fibre preform wherein the bore of a glass tube is coated with a layer of material which either is a glass of higher refractive index than that of the tube, or is a material which will transform under the action of heat into such a glass, or is a material that will react with the material of the tube under the action of heat to form a surface region of such a glass, and wherein the coated tube is rotated while being heated sufficiently to cause the collapse of its bore so as to produce an optical fibre preform of circular symmetry. The resulting preform may then be drawn into a fibre as a separate stage.

The invention also provides a method of making an optical fibre or optical fibre preform wherein the bore of a glass tube is coated with a layer of material consisting of or including germania, wherein the material either is a glass of higher refractive index than that of the tube or is a material which will transform under the action of heat into such a glass, or is a material that will react with the material of the tube under the action of heat to form a surface region of such a glass, wherein said material is deposited by a reaction from which hydrogen and hydrogen containing compounds are excluded, and wherein the coated tube is heated and its bore collapsed to form an optical fibre or optical fibre preform.

The invention further provides a method of making an optical fibre or optical fibre preform wherein the bore of a silica tube is coated with a layer of germania and wherein the coated tube is heated and its bore collapsed to form an optical fibre or optical fibre preform having a core of mixed germania-silica composition.

This invention also discloses a method of making an optical fibre or optical fibre preform wherein the bore of a silica tube is coated with a layer of dopant material that is the oxide of a single element, which oxide is an oxide that can be diffused into silica to form a glass of higher refractive index than that of silica, wherein said material is deposited by a reaction from which hydrogen and hydrogen containing compounds are excluded, and wherein the coated tube is heated and its bore collapsed to form an optical fibre or optical fibre preform having a core of mixed dopant-silica composition.

Preferred deposition materials for coatings of the type which react with the bore of the tube to form a glass of higher refractive index than that of the glass of the tube include oxides of germanium, aluminum, titanium, arsenic, gallium, phosphorus, antimony, tantalum, tin, niobium, indium, and zirconium.

For many applications the presence of -OH groups in or near the core of an optical fibre produces undesirable attenuation and hence it is preferred to select a deposition process from which hydrogen and hydrogen containing compounds are excluded.

The tube referred to is not necessarily a self supporting structure but may take the form of a deposited layer lining the bore of another tube. Suitable coating methods include thermally induced vapor reaction, evaporation, r.f. sputtering, and r.f. excited vapor reaction. There follows a description of the manufacture of an optical fibre to carry radiation in the range 800–875 nm. The description refers to the accompanying drawings.

BRIEF DESCRIPTION OF THE DRAWINGS

FIGS. 1 and 2 depict alternative structures of coated tube prior to collapse of the bore into a fibre preform and subsequent drawing into optical fibre, FIG. 3 depicts apparatus for coating the bore of a tube, and FIG. 4 depicts the collapsing of the bore of a tube to form an optical fibre preform.

DESCRIPTION OF THE PREFERRED EMBODIMENTS

FIG. 1 depicts the structures produced by a simple manufacturing process involving the deposition of only one layer 10 upon the bore of a tube 11. The core of the completed fibre is provided at least in part by the material of the deposited layer 10 while the cladding is provided by the material of the tube 11.

In a single mode optical fibre a significant proportion of the optical signal propagates in the cladding. The transmissivity of the cladding material is therefore an important factor affecting the optical loss of the fibre. Normally however for mechanical reasons the thickness of the cladding is made much greater than the depth to which any significant proportion of the optical energy penetrates. Thus it is only the region of the cladding nearest the core which really needs to have a high transmissivity.

Advantage of this factor is taken in the manufacturing process used to produce the structures depicted in FIG. 2. The bore of a glass tube 20 is lined with a layer 21 of glass and then a further layer 22. The core of the completed fibre is provided at least in part by the material of the second deposited layer 22, while the inner and outer regions of the cladding are provided respectively by the material of the first deposited layer 21 and the material of the tube 20.

The outer region of the cladding can safely be made more lossy than the other remainder of the fibre, but energy should not be coupled into it from the core. To satisfy this condition the outer cladding refractive index must not be greater than that of the inner cladding. The refractive index of this inner cladding must, in its turn, be less than that of the core. It may be noted that the refractive index of an absorbing medium is strictly a complex quantity and that it is the real part of the refractive index of the tube 20 which must be not greater than the refractive index of the layer 21.

Typically a single mode fibre has a core of 3-4 μm diameter whereas the core of a multimode fibre may typically be up to 60 μm diameter. The diameter of the cladding is typically up to 150 μm, and the difference refractive index ratio of core to cladding is typically 1.01.

A typical manufacture for an optical fibre to carry radiation in the range 800-875 nm employs a silica tube 30, FIG. 3, typically 7 mm external diameter with 1 mm wall thickness, and 33 cm long. The bore of the tube is flame polished and then vacuum baked to remove any traces of moisture. An alternative preparation treatment comprises acid etching the bore of the tube, washing it, and then heating it to drive off the residual water. The presence of moisture may produce —OH groups in the completed fibre with their attendant undesirable absorption in the wavelength region of 0.95 μm.

After the tube has been dried it is placed so as to pass through the center of a resistance wound furnace 31, with the tube ends located in two adaptors 32a and 32b, for example of polytetrafluoroethylene.

The adapter 32a is coupled to an inlet tube 33 having a first inlet port 34 for oxygen, a second inlet port 35 for germanium or, for example, germanium tetrachloride entrained in a carrier gas, and a third inlet port 36 for the introduction of a suitable material for depositing silica (as will be described later). The adapter 32b is coupled to an exhaust tube 37.

Germania is deposited upon the surface of the bore of the tube as the product of a thermally induced chemical vapor reaction. The chemical reactants for this process may be germanium and oxygen, but since one of the reaction products is water this is liable to produce unwanted —OH groups in the final product. This problem is avoided by using any non-hydrogen containing compounds such as a halide, e.g., germanium tetrachloride in place of the hydride. Germanium can be introduced into the reaction zone as a gas, but germanium tetrachloride is a liquid at room temperature and hence is introduced as a vapor entrained in a carrier gas.

The reacton does not proceed spontaneously at room temperature, but is promoted in the localized hot zone inside the furnace. A uniform coating along the length of the bore of the tub is provided by careful control of reaction parameters such as flow rates, temperatures and vapor pressure, etc. For longer lengths a moving hot zone is to be preferred, the deposition following the hot zone as it proceeds along the tube.

The germania may be deposited as a powdery layer or as a glassy layer according to the temperature and flow conditions of deposition. Both forms are suitable for the manufacture of optical fibre.

A typical deposition process uses oxygen as a carrier gas in which to entrain germanium tetrachloride. Oxygen is bubbled at the rate of about 200 cc per minute through germanium tetrachloride maintained at a constant temperature typically about −40° C. This vapor and gas mixture is passed through the tube 30 while the furnace is maintained at a temperature of about 1000° C. The rate of deposition is controlled by bleeding in additional oxygen. Typically the deposition rate is controlled to provide a layer a few microns thick over a period of about an hour. This deposition process may be modified by the substitution of germanium tetra-iodide in place of the chloride. The iodide is a solid at room temperature and its vapor is entrained in the oxygen carrier gas by heating it to a temperature of about 140° C.

The use of the iodide may be preferred in the co-deposition process involving the simultaneous deposition of germania and silica because the iodide of silicon will react at a lower temperature than its chloride.

The coated tube is removed from the deposition apparatus and mounted in apparatus for collapsing its bore. In this apparatus it is supported at both ends and rotated about its axis while a high temperature heat source such as an oxyhydrogen flame is passed slowly along its length. As the flame approaches each part of the tube the temperature of the inner wall first rises sufficiently to cause the deposited powdery germania layer 40 to react with the silica of the tube 41 to form a transparent glassy layer 42 of mixed composition. Then as the flame gets nearer the temperature rises still further to a temperature at which the tube becomes so soft that its bore collapse as indicated at 44. At this stage the layer 42 has become the core 45 of an optical fibre preform 46. The resulting peak difference in refractive index between core and cladding is typically in the range 0.02 to 0.03 indicating that the germania reacts strongly with the wall of the tube.

After the collapsed tube optical fibre preform is removed from the collapsing apparatus it is mounted in conventional fibre pulling apparatus for drawing down into optical fibre. This requires a short hot zone capable of producing a temperature at which drawing can take place.

If the quality of the initial silica tube is such that it does not have sufficiently low loss, the deposition apparatus can be used to deposit a layer of pure silica prior to the deposition of the germania. If the silica is deposited as a powdery layer, it is heated to turn it into a glassy layer before the germania is deposited. One way of depositing the silica involves reacting silicon tetrachloride or tetra-iodide with oxygen. Silica may also be deposited simultaneously with the deposition of germania.

The concentration profile of the germania in the optical fibre preform depends to a large extent upon the temperature cycling that has taken place during its manufacture. One effect of high temperature is to allow the germania to diffuse into the glass of the tube, but another effect, which is liable to occur before collapse of the bore, is the depletion of germania from the inner surface by evaporation. With appropriate control of the heating cycle a deliberately graded refractive index profile may be obtained to provide an optical fibre preform suitable for drawing down into a self-focussing type of optical fibre.

Particularly if the deposited layer consists of pure germania rather than co-deposited germania and silica, the use of a sharply localized heating source for collapsing the bore is liable to produce so much evaporation of the germania that the central region of the core of the resulting preform is substantially devoid of germania. The dip in refractive index at the center of the core that this produces is undesirable for many applications. If however the tube is given a first heat treatment before collapse, the dip in refractive index can be considerably reduced or virtually eliminated. The first heat treatment consists of taking the tube up to a temperature lower than the temperature required for collapse. Typically each part of the tube is taken to the lower temperature for a period ranging from a few seconds to a few minutes. With this type of initial heat treatment optical fibres can be produced with a concentration of germania at the center of the core of greater than 7 mole %.

This heat treatment also has the effect of producing a graded profile by decreasing the steepness of the transition in refractive index across the boundary between the core and cladding regions of the preform and thus contributes to a lessening of the mode dispersion.

In the control of the refractive index grading between the core and cladding regions use may be made of more than one dopant so as to take advantage of different diffusion properties. For instance germania can be co-deposited with alumina. In a subsequent heat treatment to promote diffusion of the germania, the alumina, reduces or eliminates the dip in refractive index at the center of the core which might occur in the absence of the alumina. If desired, the alumina can be deposited after the deposition of the germania instead of simultaneously with it.

Although previous reference has been made to the use of an oxyhydrogen flame as a heat source, this is not the preferred heat source because it is believed that it may be a source of contamination of the final fibre with —OH groups. For this reason it is preferred to substitute hydrogen-free heat sources, such as a resistive tube furnace or an r.f. heated susceptor, for all heating stages of manufacture including the final stage of drawing the preform into optical fibre.

It is to be understood that the foregoing description of specific examples of this invention is made by way of example only and is not to be considered as a limitation on its scope.

What is claimed is:

1. A method of making an optical fiber preform suitable for drawing into an optical fiber including the steps of:
    providing a hollow glass tube of a first refractive index and having a predetermined length with a bore formed therethrough;
    introducing into said bore, in unreacted dry vapor form, material that forms a glass layer,
    coating said bore by thermally depositing said material thereon to form a glass layer of higher refractive index than the refractive index of said tube;
    rotating said glass tube about its longitudinal axis by a rotating device; and
    heating said coated tube to collapse said tube into a solid preform having substantially the same length as said predetermined layer whereby the glass coating layer becomes a core of said higher index of refraction than the refractive index of said tube.

2. The method of making an optical fiber preform as set forth in claim 1, wherein said core material includes an amount of germania in excess of 7 mole %.

3. The method of making an optical fiber preform as set forth in claim 1, wherein said tube is made of a silica glass and wherein said material includes germania and silica in order to produce an optical fiber preform having a core of mixed germania-silica composition.

4. A method of making an optical fiber preform as set forth in claim 1, wherein said tube is made of a silica glass, the material that forms the glass layer is a dopant material that can be diffused into the silica glass to form a glass of a higher refractive index than the index of refraction of silica, and wherein said dopant material is deposited on the bore of said tube by a reaction from which hydrogen and hydrogen containing compounds are excluded and said dopant material is diffused into the bore of said silica tube.

5. The method of claim 1, wherein said coated tube is first heated to allow a diffusion of the material into the surface region of the bore of said tube and wherein the collapse of said bore and coating is affected during a subsequent heating stage during which time said tube and coating are taken to a temperature higher than the temperature at which said coating took place.

6. An optical fiber drawn from an optical fiber preform made by the method of claim 1.

7. A process for fabrication of a glass optical fiber preform having a core section and a cladding comprising the steps of:
    introducing a moving stream of a vapor mixture including at least one compound glass forming precursor together with an oxidizing medium into a tube of a predetermined length,
    heating the tube and contents by a moving hot zone produced by a correspondingly moving heat source external to the tube so as to react the said mixture and produce a glassy layer on the inner surface of the tube,
    rotating said glass tube about its longitudinal axis by a rotating device; and
    heating said coated tube to collapse said tube into a solid preform having substantially the same length as said predetermined length whereby the glass coating layer becomes a core having a higher index of refraction than the refractive index of said tube.

8. The process of claim 7, wherein said vapor mixture includes oxygen and chlorides of silicon and germanium.

9. An optical fiber drawn from an optical fiber preform made by the method of claim 7.

10. A method of making an optical fiber preform having a glass core and a glass cladding comprising the steps of:
    introducing a stream of vapors into the interior of a glass tube having a first refractive index and a predetermined length, said vapor being chemically reactive in the process of heating to form glass substantially similar to that of said glass core,
    establishing a localized hot zone in the interior of said glass tube to react vapor within said hot zone,
    moving said hot zone longitudinally along substantially the same length of said glass tube to coat a layer of glass substantially similar to said glass core on the inside wall of said glass tube,
    rotating said glass tube about its longitudinal axis by a rotating device; and
    heating said coated tube to collapse said tube into a solid preform having substantially the same length as said predetermined length whereby the glass coating layer becomes a core having a higher index of refraction than the refractive index of said tube.

11. An optical fiber drawn from an optical fiber preform made by the method of claim 10.

* * * * *

Notice of Adverse Decision in Interference

In Interference No. 101,316, involving Patent No. 4,341,441, P. E. Lighty, P. W. Black and J. Irven, METHOD OF MAKING SOLIDS PREFORMS AND OPTICAL FIBERS DRAWN THEREFROM, final judgment adverse to the patentees was rendered July 1, 1987, as to claims 1, 3, 6-26.

[*Official Gazette November 21, 1989*]

REEXAMINATION CERTIFICATE (501st)
United States Patent [19]
Lighty et al.

[11] B1 4,341,441
[45] Certificate Issued     May 6, 1986

[54] METHOD OF MAKING SOLID PREFORMS AND OPTICAL FIBERS DRAWN THEREFROM

[75] Inventors: Paul E. Lighty, Lafayette, N.J.; Philip W. Black, Mountfitchet; John Irven, Bishop Stortford, both of England

[73] Assignee: International Standard Electric Corp., New York, N.Y.

Reexamination Request:
No. 90/000,789, May 28, 1985

Reexamination Certificate for:
Patent No.: 4,341,441
Issued: Jul. 27, 1982
Appl. No.: 761,746
Filed: Jan. 24, 1977

Related U.S. Application Data

[63] Continuation of Ser. No. 497,990, Aug. 16, 1974, abandoned.

[30] Foreign Application Priority Data

Aug. 21, 1973 [GB] United Kingdom ............... 39444/73

[51] Int. Cl.$^4$ ................... C03B 37/025; C03B 37/075
[52] U.S. Cl. .................................. 350/96.30; 65/3.12; 65/3.2; 427/163; 427/231; 427/237

[56] References Cited

U.S. PATENT DOCUMENTS

| | | | |
|---|---|---|---|
| 3,711,262 | 1/1973 | Keck et al. | 65/3.12 |
| 3,737,292 | 6/1973 | Keck et al. | 65/3.12 |
| 3,778,132 | 12/1973 | Pinnow et al. | 350/96 |
| 3,806,224 | 4/1974 | MacChesney et al. | 350/96 |
| 3,853,384 | 12/1974 | Pinnow et al. | 350/96 |
| 3,884,550 | 5/1975 | Maurer et al. | 65/3.11 X |
| 3,963,468 | 6/1976 | Jaeger et al. | 65/3 |

OTHER PUBLICATIONS

Powell et al.; Vapor Deposition Textbook, pp. xii and 262–263, published by John Wiley & Sons, Inc., N.Y., 1966.

Journal of Electronic Materials, vol. 2, 1973; Editorial Page, Cover Pages for vol. 2, No. 1, and vol. 2, No. 2; pp. 159, 373, 617, 623; and Instructions to Contributors Page.

Hass et al.; Physics of Thin Films, pp. 238, 286–289, Academic Press, 1969.

Powell et al., "Vapor Deposition Textbook", pp. 11, 12; 149–153; 259–261; 391–397; 549–578, published by John Wiley & Sons, 1966.

French et al., Abstract F2, Conference Program-Preparation and Properties of Electronic Materials, Sponsored by Electronic Materials Committee of The Metallurgical Society of AIME, 1973.

Scientific and Industrial Glass Blowing and Laboratory Techniques, W. E. Barr et al., Jan. 1949, pp. 29–54 (Chapter II).

*Scientific Glassblowing*, E. L. Wheeler, pp. 64–65, Interscience Publishers, Inc., 1958.

*75th Annual Meeting and Exposition, American Ceramic Society Bulletin*, Abstract #29-G-73, A. D. Pearson, Apr. 1973, vol. 52, No. 4.

*Proceedings of the 1973 Electronic Materials Conference*, Aug. 29, 1973, Session F, Abstract #F2, W. G. French et al., p. 623, appearing in: *Journal of Electronic Materials*, vol. 2, No. 4, 1973, p. 617.

Scientific and Industrial Glass Blowing and Laboratory Techniques, W. E. Barr et al., Jan. 1949, pp. ii–iii and 29.

Thin Film Technology, R. W. Berry et al., 1968, pp. 266–267.

Applied Physics Letters, vol. 23, #6, 1973, pp. 338–339.

*Primary Examiner*—Kenneth M. Schor

[57] ABSTRACT

An optical glass fiber is formed of an inner layer of germania doped glass within the bore of the outer cladding tube of silica. The tube with the higher index of refraction inner layer is rotated while being heated to collapse the bore to form an optical fiber preform. The preform is then drawn into fiber in a separate operation. A first silica layer can be deposited within the tube bore before the germania doped layer. The deposition of germania takes place under hydrogen free conditions. Appropriate heat treatment of the tube avoids excessive evaporation of germania and provides a graded transition of the refractive index in the boundary between core and cladding.

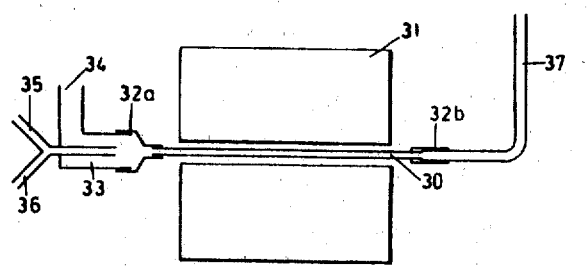

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-11 is confirmed.

New claims 12-26 are added and determined to be patentable.

*12. A method of making an optical fiber preform suitable for drawing into an optical fiber including the steps of:*

*providing a hollow glass tube of a first refractive index and having a predetermined length with a bore formed therethrough;*

*introducing into said bore, in unreacted dry vapor form, material that forms a glass layer,*

*coating said bore by thermally depositing said material thereon to form a glass layer of higher refractive index than the refractive index of said tube;*

*rotating said coated glass tube about its longitudinal axis by a rotating device; and*

*heating said rotating coated tube to collapse said tube into a solid preform having substantially the same length as said predetermined length whereby the glass coating layer becomes a core of said higher index of refraction than the refractive index of said tube.*

*13. The method of claim 12 wherein said heating step is accomplished by passing a heat source along the length of said tube.*

*14. The method of claim 13 wherein said core includes germania and silica.*

*15. An optical fiber drawn from an optical preform made by the method of claim 14.*

*16. A process for fabrication of a glass optical fiber preform having a core section and a cladding comprising the steps of:*

*introducing a moving stream of a vapor mixture including at least one compound glass forming precursor together with an oxidizing medium into a tube of a predetermined length,*

*heating the tube and contents by a moving hot zone produced by a correspondingly moving heat source external to the tube so as to react the said mixture and produce a glassy layer on the inner surface of the tube,*

*rotating said coated glass tube about its longitudinal axis by a rotating device; and*

*heating said rotating coated tube to collapse said tube into a solid preform having substantially the same length as said predetermined length whereby the glass coating layer becomes a core having a higher index of refraction than the refractive index of said tube.*

*17. The process of claim 16 wherein the second mentioned heating step is accomplished by passing a heat source along the length of said tube.*

*18. The process of claim 16 wherein said core includes germania and silica.*

*19. An optical fiber drawn from an optical fiber preform made by the method of claim 17.*

*20. A method of making an optical fiber preform having a glass core and a glass cladding comprising the steps of:*

*introducing a stream of vapors into the interior of a glass tube having a first refractive index and a predetermined length, said vapor being chemically reactive in the process of heating to form glass substantially similar to that of said glass core,*

*establishing a localized hot zone in the interior of said glass tube to react vapor within said hot zone,*

*moving said hot zone longitudinally along substantially the same length of said glass tube to coat a layer of glass substantially similar to said glass core on the inside wall of said glass tube,*

*rotating said coated glass tube about its longitudinal axis by a rotating device; and*

*heating said rotating coated tube to collapse said tube into a solid preform having substantially the same length as said predetermined length whereby the glass coating layer becomes a core having a higher index of refraction than the refractive index of said tube.*

*21. The method of claim 20 wherein said heating step is accomplished by passing a heat source along the length of said tube.*

*22. The method of claim 20 wherein said core includes germania and silica.*

*23. An optical fiber drawn from an optical fiber preform made by the method of claim 20.*

*24. The method of claim 1 wherein the coating, rotating and heating steps occur in the order recited.*

*25. The process of claim 7 wherein the first mentioned heating, the rotating and the second mentioned heating steps occur in the order recited.*

*26. The method of claim 10 wherein the moving, rotating and heating steps occur in the order recited.*

* * * * *